United States Patent
Scheerer et al.

(10) Patent No.: US 11,612,952 B2
(45) Date of Patent: Mar. 28, 2023

(54) MAGNETIC CLAMPING HEAT SINK ASSEMBLY

(71) Applicant: SFS intec Holding AG, Heerbrugg (CH)

(72) Inventors: Daniel Scheerer, Sinking Spring, PA (US); Jarrod Woodland, Boyertown, PA (US); Rob Stricek, Sinking Spring, PA (US)

(73) Assignee: SFS Intec Holding AG, Heerbrugg (CH)

( * ) Notice: Subject to any disclaimer, the term of this patent is extended or adjusted under 35 U.S.C. 154(b) by 214 days.

(21) Appl. No.: 17/143,519

(22) Filed: Jan. 7, 2021

(65) Prior Publication Data
US 2021/0121976 A1  Apr. 29, 2021

Related U.S. Application Data

(62) Division of application No. 15/907,443, filed on Feb. 28, 2018, now Pat. No. 10,919,104.

(60) Provisional application No. 62/464,818, filed on Feb. 28, 2017.

(51) Int. Cl.
*B23K 13/01* (2006.01)
*E04D 15/04* (2006.01)
*B23K 37/00* (2006.01)

(52) U.S. Cl.
CPC ............ *B23K 13/01* (2013.01); *B23K 37/003* (2013.01); *E04D 15/04* (2013.01); *E04D 2015/042* (2013.01)

(58) Field of Classification Search
CPC . C09J 5/06; E04D 15/00; E04D 15/04; E04D 2015/042; B23K 13/01; B23K 37/003
See application file for complete search history.

(56) References Cited

U.S. PATENT DOCUMENTS

| | | |
|---|---|---|
| 2006/0237448 A1 | 10/2006 | Barber et al. |
| 2008/0029507 A1 | 2/2008 | Barber et al. |
| 2014/0196844 A1 | 7/2014 | Shadwell |
| 2014/0345806 A1 | 11/2014 | Gasser et al. |
| 2015/0144617 A1 | 5/2015 | Challita et al. |

(Continued)

FOREIGN PATENT DOCUMENTS

| | | |
|---|---|---|
| JP | 3495792 B2 | 2/2004 |
| JP | 2005-180141 A | 7/2005 |

(Continued)

*Primary Examiner* — Vishal Pancholi
*Assistant Examiner* — Robert K Nichols, II
(74) *Attorney, Agent, or Firm* — Volpe Koenig

(57) ABSTRACT

A method of fixing a membrane to a surface is disclosed. The method includes affixing a metallic washer having a heat-activated adhesive layer on a surface; arranging a membrane on top of the surface and the heat-activated adhesive layer of the metallic washer; heating the metallic washer to activate the heat-activated adhesive layer such that the membrane is fixable to the metallic washer; positioning a magnetic clamping heat sink assembly on the membrane; magnetically clamping the magnetic clamping heat sink assembly to the metallic washer causing the magnetic clamping heat sink assembly to apply a force against the membrane when the magnetic clamping heat sink assembly sufficiently overlaps the metallic washer to form a secure bond; and cooling the metallic washer, the heat-activated adhesive layer, and the membrane by removing heat through the magnetic clamping heat sink assembly.

6 Claims, 11 Drawing Sheets

(56) References Cited

U.S. PATENT DOCUMENTS

2017/0254090 A1 9/2017 Allor et al.
2017/0274550 A1 9/2017 Potter

FOREIGN PATENT DOCUMENTS

| JP | 2010-229669 A | 10/2010 |
|----|---------------|---------|
| JP | 2016-110824 A | 6/2016  |

MAGNETIC CLAMPING HEAT SINK ASSEMBLY

INCORPORATION BY REFERENCE

This application is a divisional of application U.S. patent application Ser. No. 15/907,443 filed Feb. 28, 2018, which claims the benefit of U.S. Provisional Application No. 62/464,818 filed Feb. 28, 2017, which are both incorporated by reference as if fully set forth.

BACKGROUND

It is well known to attach a membrane to a roof to provide weather protection for the roof. A heat-activated adhesive can be provided on a metallic element for attaching the membrane to the roof. The metallic element is typically a metallic washer with an axially raised ring including the heat-activated adhesive. An array of the metallic elements is typically provided on the roof, and each of the metallic elements must be heated to activate the heat-activated adhesive and subsequently cooled. Inductive heating equipment has been developed by the assignee of the present application that heats the metallic washers and activates the heat-activated adhesive as well as softens the membrane such that the membrane is fixable to each of the metallic washer via the heat-activated adhesive.

In order to install the membrane on the roof in a quick and reliable manner, it is known to use a magnetic clamping heat sink device, such as disclosed in U.S. Pub. 2014/0196844. These known magnetic clamping heat sink devices do not provide sufficient cooling capability due to limited heat sink features, and/or are difficult to place directly over the metallic washers due to magnetic attraction between magnets within the magnetic clamping heat sink device and the metallic washers causing the clamp to position itself prior to being generally centered on the metallic washers, which are covered by the roofing membrane.

It would be desirable to provide a more accurately positionable magnetic clamping heat sink device that is more easily movable and also includes enhanced heat sink capability.

SUMMARY

In one embodiment, a magnetic clamping heat sink assembly is disclosed that includes multiple heat sink features, as well as variable operating conditions to provide improved positioning of the magnetic clamping heat sink assembly while positioning it over a heated metallic washer.

In one embodiment, a magnetic clamping heat sink assembly is disclosed including a magnetic assembly with a carrier body including a magnet. A spring resiliently biases the carrier body, and a base assembly includes a base plate. In a first operating condition, the base assembly of the magnetic clamping heat sink assembly is positioned in a first position away from a ferromagnetic element, and the spring holds the carrier body at a medial position spaced apart from the base plate. In a second operating condition, the base assembly of the magnetic clamping heat sink assembly is positioned in a second position adjacent to the ferromagnetic element, and the carrier body is driven downward against a force of the spring to a lower position and into contact with the base plate by magnetic attraction between the at least one magnet and the ferromagnetic element.

In one embodiment, the magnetic clamping heat sink assembly includes a guide housing defining an internal channel. A magnetic assembly is movable in the internal channel and includes a carrier body defining at least one seat, at least one magnet arranged within the at least one seat, a post extending from the at least one seat that defines an internal chamber, and a spring arranged within the internal chamber of the post. A first end of the spring engages an axial end surface of the internal chamber, and the magnetic assembly is configured to be at least partially received within the internal channel. A base assembly is provided that includes a base plate and a shaft that is dimensioned to be received within the internal chamber of the post. A first end of the shaft defines a spring engagement surface that engages a second end of the spring. In a first operating condition, the base assembly of the magnetic clamping heat sink assembly is positioned in a first position away from a metallic washer, and the spring holds the carrier body at a medial position spaced apart from the base plate. In a second operating condition, the base assembly of the magnetic clamping heat sink assembly is positioned in a second position adjacent to the metallic washer, and the carrier body is driven downward on the shaft against the spring to a lower position and into contact with the base plate by magnetic attraction between the at least one magnet and the metallic washer.

The variable operating conditions of the magnetic clamping heat sink device allow centering of the magnetic clamping heat sink assembly over the metallic washer for more effective clamping and connection of the membrane to the metallic washer.

The magnet in the carrier body can be moved to different distances from the base plate, based on the varying magnetic attraction between the magnet and the metallic washer, which increases as the magnet is centered over the metallic washer until the spring force is overcome and the magnet moves to the lower clamping position. This preferably occurs when there is at least about 75% overlap of the magnetic clamping heat sink assembly and the area of the metallic washer.

Additional heat sink features are provided on the magnetic clamping heat sink assembly that provide improved cooling capability.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
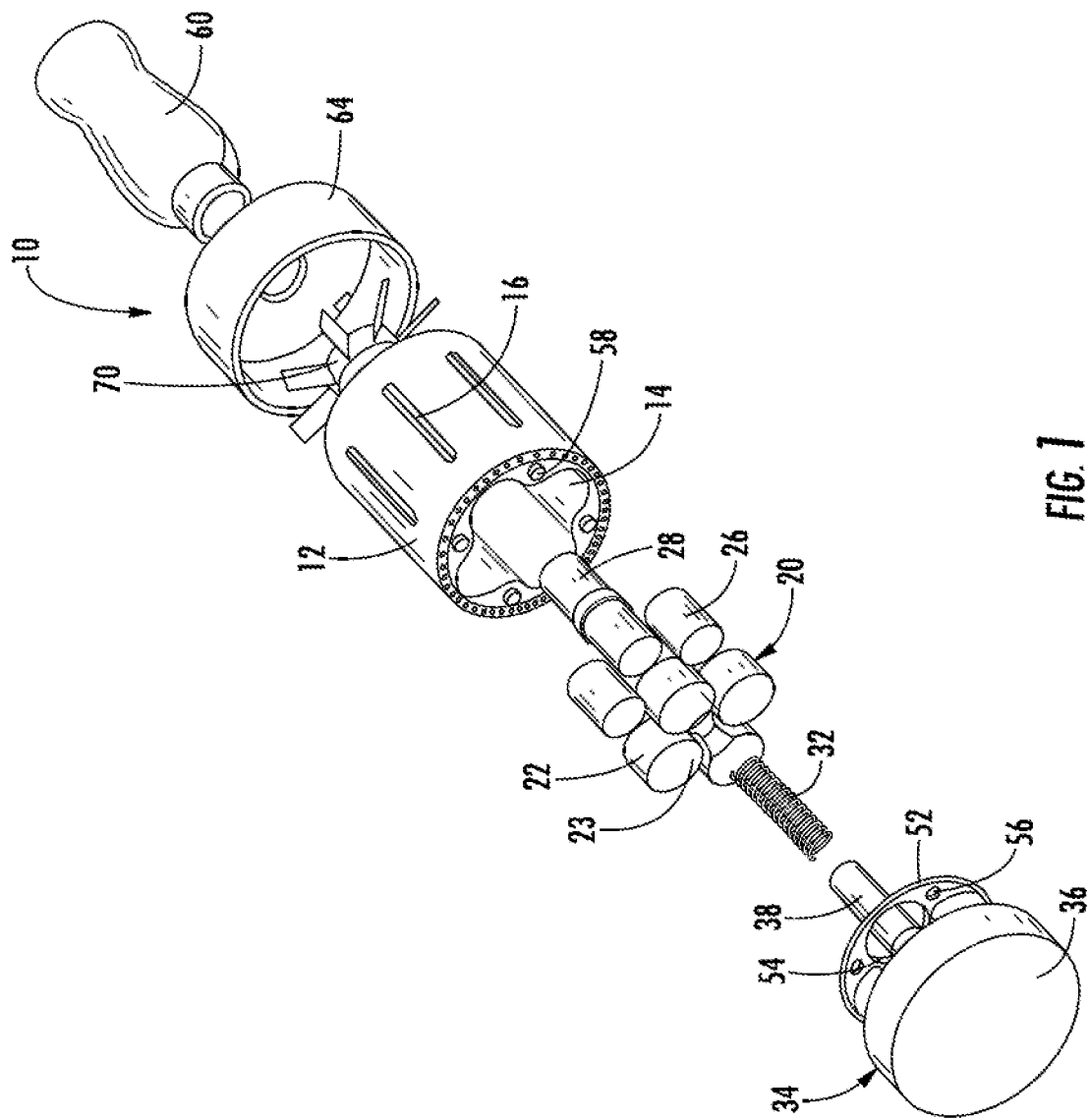
FIG. 1 is an exploded perspective view of a magnetic clamping heat sink assembly according to a first embodiment.
Figure 2:
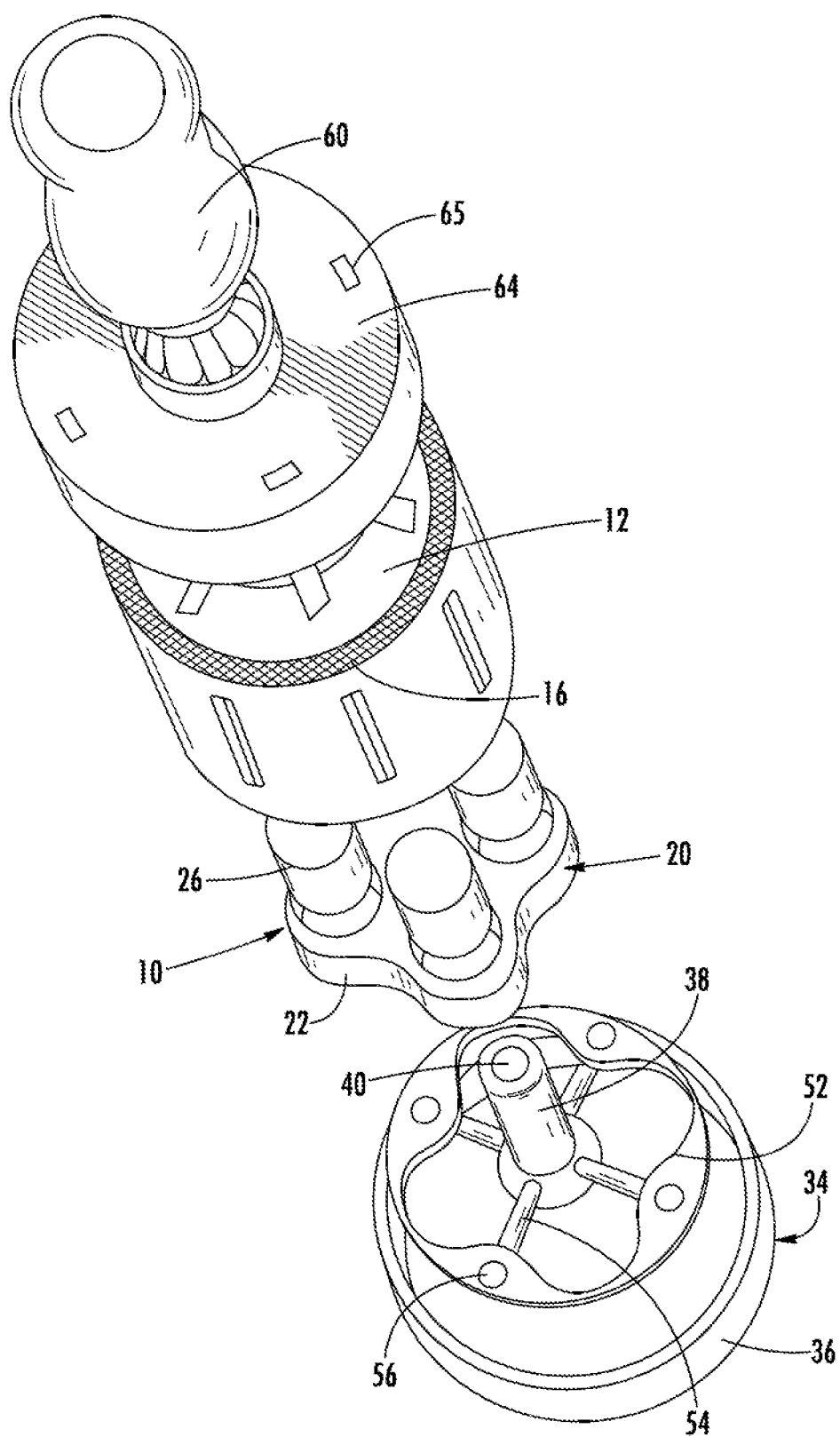
FIG. 2 is another exploded perspective view of the magnetic clamping heat sink assembly of FIG. 1.

Certain terminology is used in the following description for convenience only and is not limiting. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 1-4C, a magnetic clamping heat sink assembly 10 according to a first embodiment is illustrated. The magnetic clamping heat sink assembly 10 includes a guide housing 12 defining an internal channel 14. In the first embodiment of the magnetic clamping heat sink assembly 10, the guide housing 12 includes an integral heat sink 16. In a second embodiment of the magnetic clamping heat sink assembly 110 illustrated in FIGS. 5, 6A, and 6B, the guide housing 112 does not include an integral heat sink, and instead a separately formed heat sink 116 is provided around a periphery of the guide housing 112. In both the first and second embodiments 10, 110, the heat sinks 16, 116 can include passive heat transfer elements, such as cooling fins, vents, lattice mesh, or other heat conducting element. Alternatively, the heat sinks 16, 116 can include active heat transfer elements, such as a coolant system including conduits and a pump, or a combination of passive and active heat transfer elements.

As shown in FIGS. 1-4C, the magnetic clamping heat sink assembly 10 includes a magnetic assembly 20 with a carrier body 22 defining at least one seat 24, at least one magnet 26 arranged within the at least one seat 24, a post 28 extending from the at least one seat 24 that defines an internal chamber 30, and a spring 32 arranged within the internal chamber 30 of the post 28. A first end 32a of the spring 32 preferably engages an axial end surface 30a of the internal chamber 30. The internal channel 14 of the guide housing 12 has a first profile that is complementary to a second profile of the carrier body 22 such that rotation of the carrier body 22 with respect to the guide housing 12 is prevented. While the profiles are illustrated as having a generally star-shaped profile with four lobes, one of ordinary skill in the art would recognize that any non-round shape could be used to prevent rotation between the carrier body 22 and the guide housing 12.

In the illustrated embodiment, the carrier body 22 preferably includes four seats 24 with four magnets 26 arranged within respective ones of the four seats 24. In one embodiment, the magnets 26 are formed from neodymium iron boron (NdFeB) and have a magnetism grade of N42. In one embodiment, the magnets 26 each have a diameter of 10 mm and a length of 30 mm. One of ordinary skill in the art would recognize from the present disclosure that the number of magnets 26 can be varied, and other sizes and materials can be used for the magnets 26. In one embodiment, a single magnet 26 can be provided. Similarly, the shape, size, and other characteristics of the spring 32 can be varied. In one embodiment, the spring 32 has a spring constant of 2.70 lb/in. In one embodiment, the spring has a length of 2.00 inches, a diameter of 0.6 inches, and is formed from a spring wire having a diameter of 0.045 inches. One of ordinary skill in the art would recognize from the present disclosure that the characteristics of the spring can be varied, as long as the spring 32 provides the requisite force for holding the carrier body 22 counter to a magnetic attractive force until a threshold magnetic attractive force is attained that is described in more detail below.

A base assembly 34 is arranged near a bottom end of the guide housing 12 and includes a base plate 36 and a shaft 38 dimensioned to be received within the internal chamber 30 of the post 28. A first end 38a of the shaft 38 defines a spring engagement surface 40 that engages a second end 32b of the spring 32. The base assembly 34 and the magnetic assembly 20 are configured to provide multiple operating conditions of the magnetic clamping heat sink assembly 10 in which a magnetic force from the magnets 26 and a spring force from the spring 32 position the carrier body 22 in different positions based on a position of the magnetic clamping heat sink assembly 10 relative to a metallic washer 3.

The base assembly 34 includes a base seat 52 arranged inside the base plate 36, and the shaft 38 extends from the base seat 52. A web 54 is configured with openings to receive a bottom end 23 of the carrier body 22 such that the at least one seat 24 and the at least one magnet 26 is arranged within the openings in the web 54 of the base seat 52 when the carrier body 22 is in a lower position. The bottom end 23 of the carrier body 22 is illustrated with a plurality of slits that mate with the web 54, however one of ordinary skill in the art would recognize from the present disclosure that other shapes can be used.

The base seat 52 preferably includes a first alignment element 56 and the guide housing 12 includes a second alignment element 58 that matingly engages with the first alignment element 56 to rotationally align the base assembly 34 with the guide housing 12. The first alignment element 56 is illustrated as four pockets and the second alignment element 58 is illustrated as four projections. One of ordinary skill in the art would recognize from the present disclosure that any shape or number of alignment elements could be used to provide alignment of the base assembly 34 with the guide housing 12. The base plate 36, the base seat 52, and the guide housing 12 are preferably captively secured to each other. The base plate 36, the base seat 52, and the guide housing 12 can be secured to each other by a fastener, weld, adhesive, press fit, or other suitable securing arrangement.

Figure 4A:
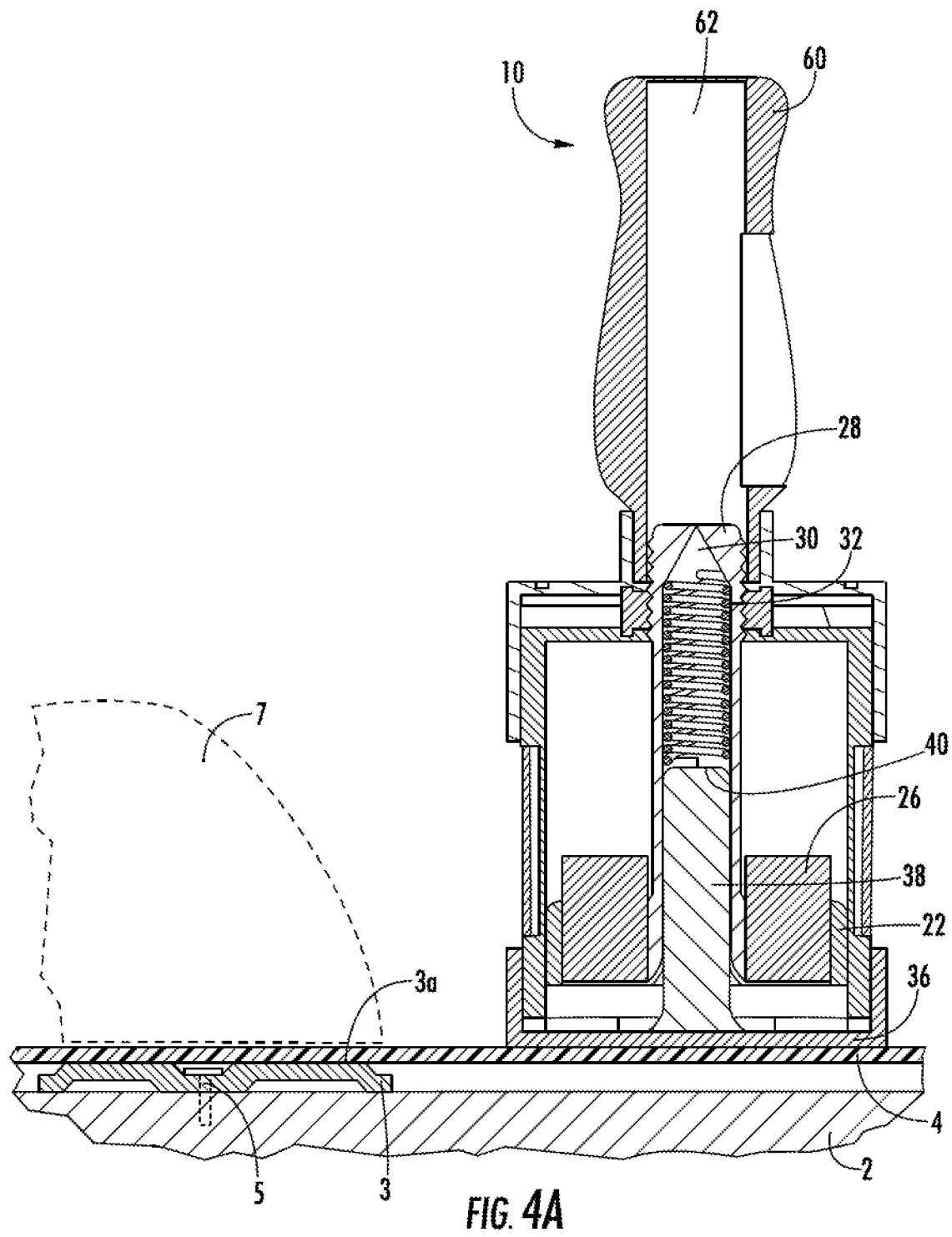
FIG. 4A is a view in cross section of the first embodiment of the magnetic clamping heat sink assembly in a first operating condition.
Figure 4B:
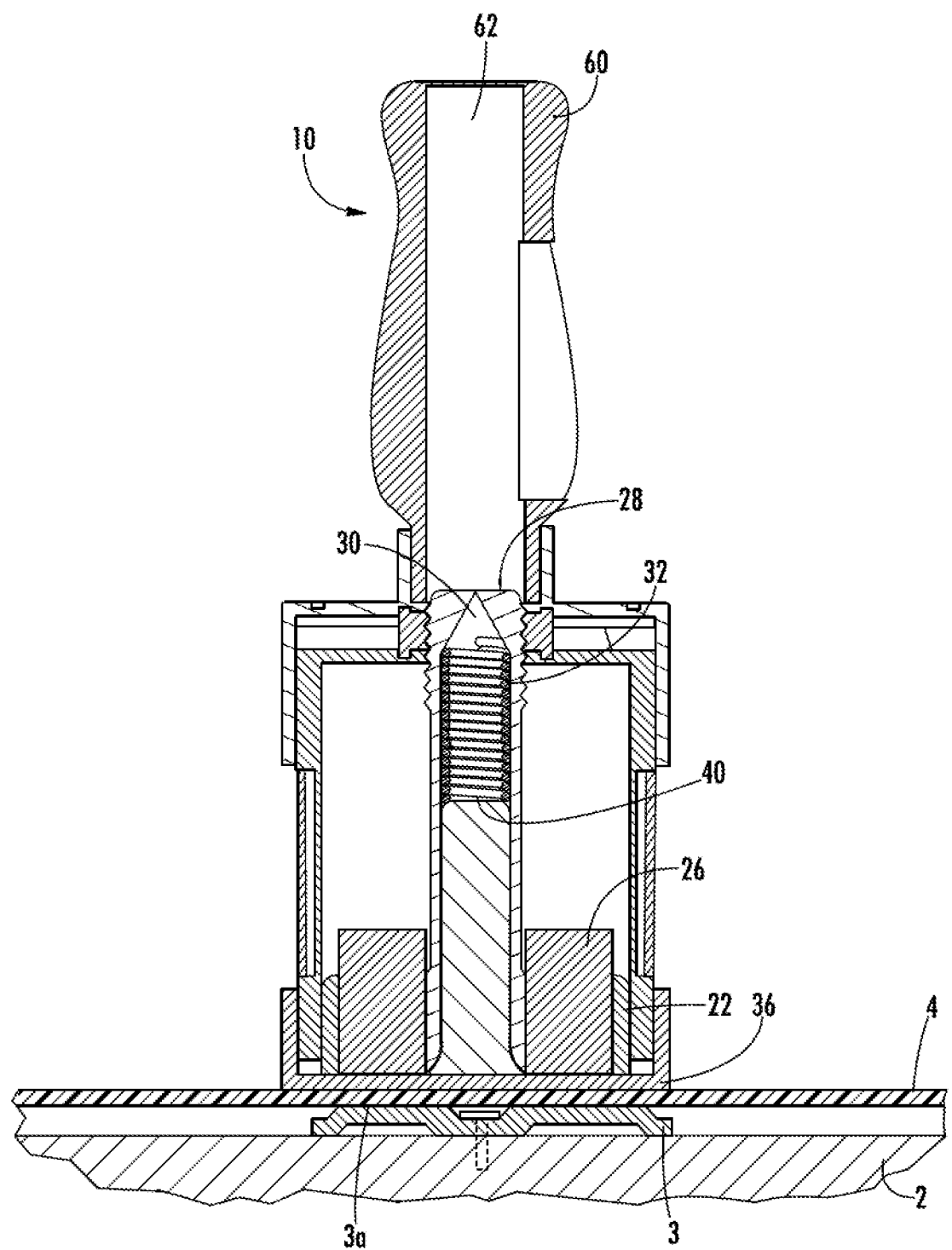
FIG. 4B is a view in cross section of the first embodiment of the magnetic clamping heat sink assembly in a second operating condition.
Figure 4C:
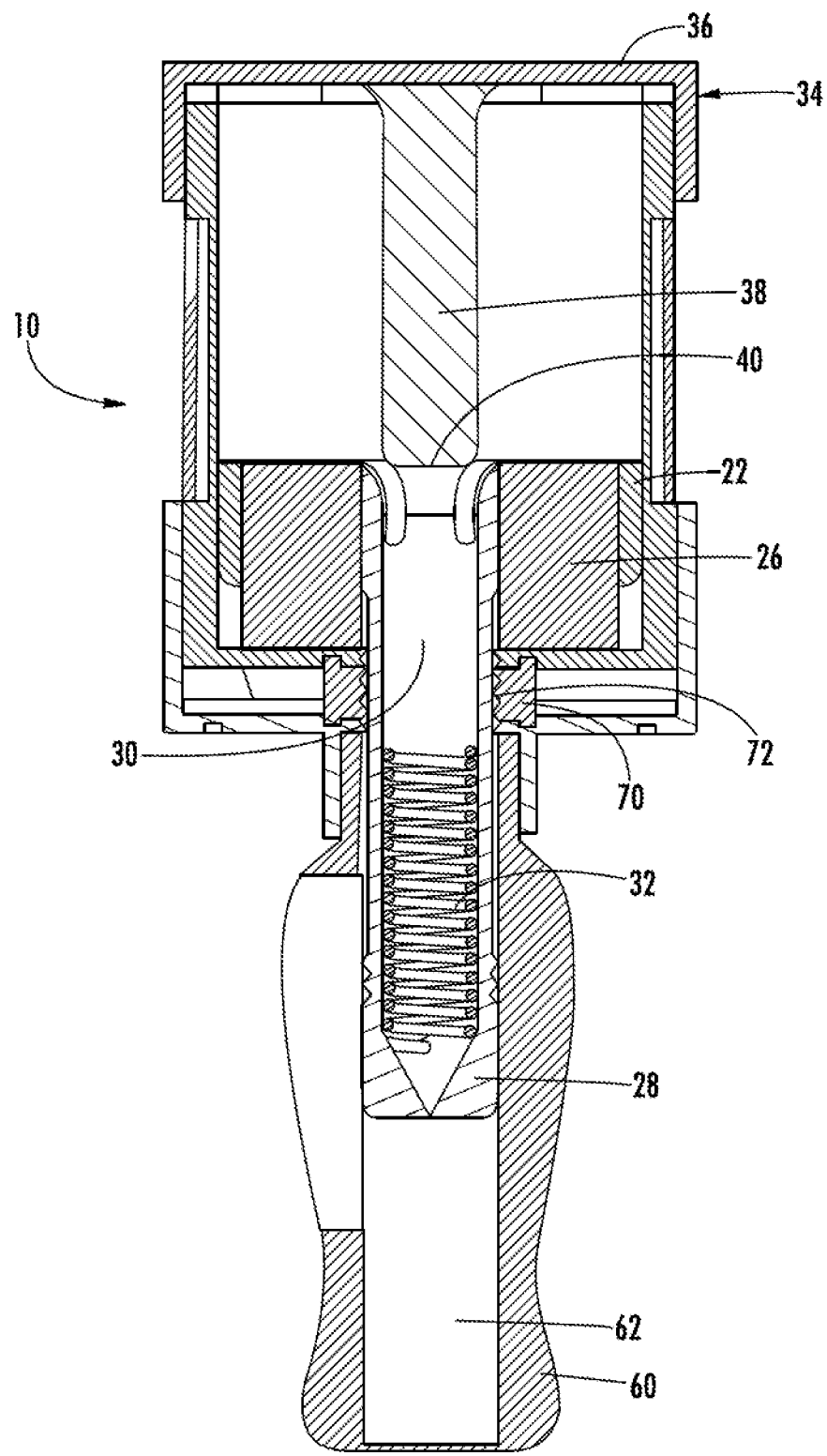
FIG. 4C is a view in cross section of the first embodiment of the magnetic clamping heat sink assembly in a third operating condition.
Figure 5:
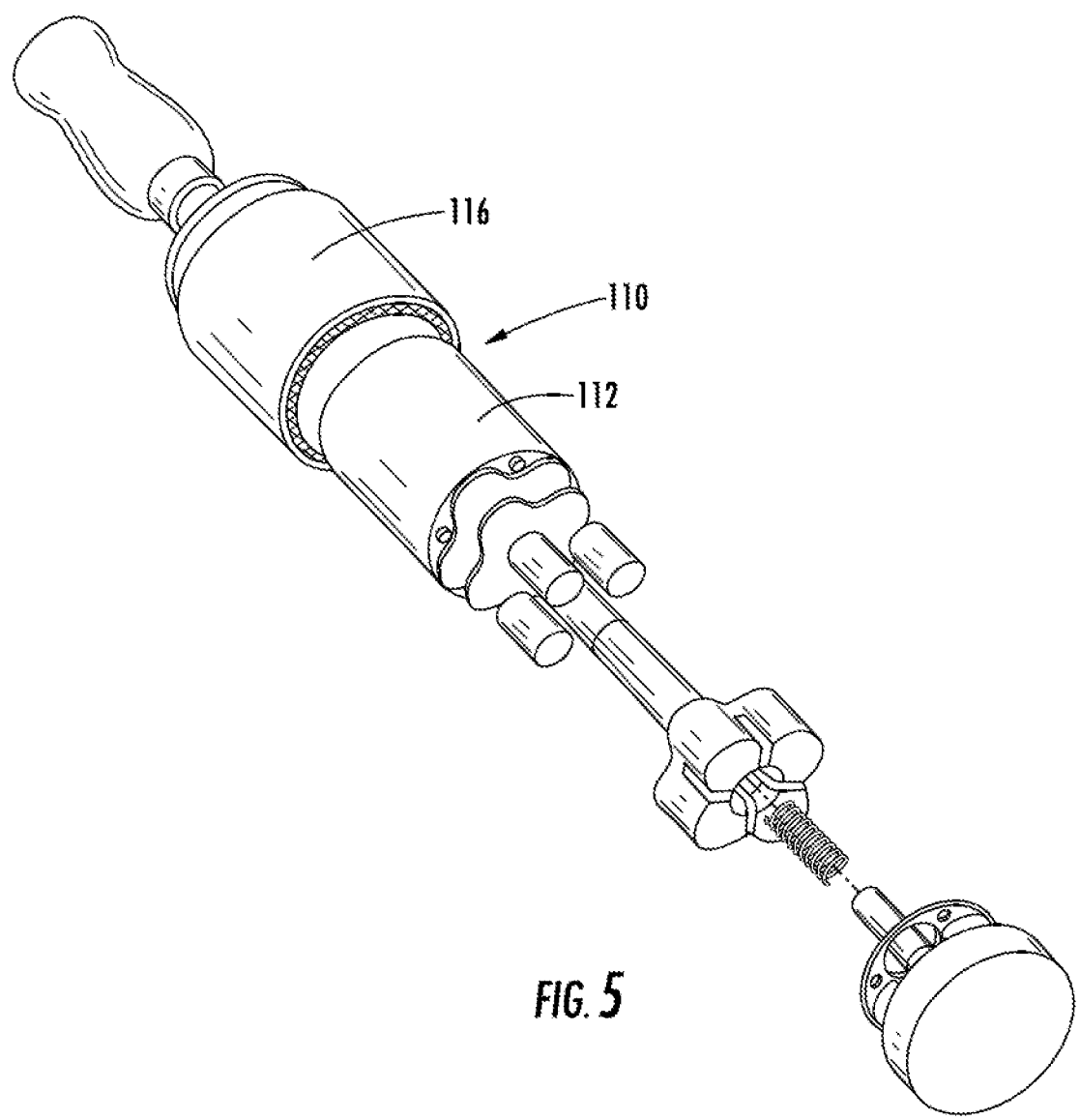
FIG. 5 is an exploded perspective view of a magnetic clamping heat sink assembly according to a second embodiment.

The magnetic clamping heat sink assembly 10 preferably includes a handle 60 defining an internal cavity 62, and a top plate 64 defining a seat 66 configured to receive an end of the handle 60. The handle 60 is preferably removable. The handle 60 provides a grip for a user to manually position the magnetic clamping heat sink assembly 10. As shown most clearly in FIG. 2, the top plate 64 defines axial heat sink openings 65. The handle 60 and the top plate 64 are fixed to a top surface of the guide housing 12. As shown in FIGS. 4A and 4B, the post 28 of the carrier body 22 is at least partially arranged within the internal cavity 62 of the handle 60 when the carrier body 22 is in both a first operating condition and a second operating condition. As shown in FIG. 4C, the post 28 of the carrier body 22 is substantially arranged within the internal cavity 62 of the handle 60 in a third operating condition. A window 68 is preferably defined on the handle 60 that extends to the internal cavity 62. The window 68 provides access for manually adjusting a position of the carrier body 22 (i.e. a user can insert a tool into the window 68 to manipulate the position of the carrier body 22), and/or for cleaning an interior of the magnetic clamping heat sink assembly 10.

In a first operating condition shown in FIG. 4A, the base assembly 34 of the magnetic clamping heat sink assembly 10 is positioned in a first position away from a metallic washer 3, or other suitable ferromagnetic element, and the spring 32 holds the carrier body 22 at a medial position spaced apart from the base plate 36. The metallic washer 3 is preferably a roofing washer. The first operating condition corresponds to a positioning mode or mobile mode for the magnetic clamping heat sink assembly 10 because the magnets 26 are positioned away from a bottom surface of the magnetic clamping heat sink assembly 10 because there is no appreciable magnetic attraction between the magnets 26 and a metallic washer 3 located beneath the base plate 36. In this operating condition, a user can freely move the magnetic clamping heat sink assembly 10 along a corresponding roof for positioning the magnetic clamping heat sink assembly 10 over a metallic washer 3 for clamping.

In a second operating condition shown in FIG. 4B, the base assembly 34 of the magnetic clamping heat sink assembly 10 is positioned in a second position adjacent to the metallic washer 3, and the magnetic attractive force overcomes the force of the spring 32 such that the carrier body 22 is driven downward on the shaft 38 to a lower position and into contact with the base plate 36 by magnetic attraction between the at least one magnet 26 and the metallic washer 3. The second operating condition corresponds to a clamping and cooling mode in which the magnetic clamping heat sink assembly 10 both provides a downward force to aid in the attachment of a membrane to a roof as well as providing cooling of a heated metallic element and heat-activated adhesive, which is described in more detail below. The magnetic clamping heat sink assembly 10 preferably moves to the second position when an overlapping area defined by the magnetic clamping heat sink assembly 10 radially overlapping the metallic washer 3 is at least about 75% of an area defined by the metallic washer 3. This is critical for good surface area bonding of the roofing membrane to the metallic washer 3. The openings in the carrier body 22 are formed to minimize a distance between the magnets 26 and the base plate 36 in the second operating condition. The distance between the magnets 26 and the base plate 36 is preferably 1.5 mm or less in the second operating condition. The characteristics of the magnets 26 and the spring 32 are selected to ensure that the carrier body 22 only moves to the clamping position, i.e. the carrier body 22 contacts the base plate 36, when the magnetic clamping heat sink assembly 10 is sufficiently positioned on top of the metallic washer 3 with at least about 75% of the surface area being overlapped for clamping.

One of ordinary skill in the art would recognize from the present disclosure that the components of the magnetic clamping heat sink assembly 10 can be formed from plastic, thermoplastic, aluminum, or any other suitable material that does not interfere or hinder the magnetic field and attractive forces between the metallic washer 3 and the magnets 26.

In a third operating condition illustrated in FIG. 4C, the magnetic clamping heat sink assembly 10 is positioned in a third position in which the carrier body 22 is moved away from the base plate 36 by gravity to an opposite side of the interior channel 14 of the guide housing 12, preferably by inverting the magnetic clamping heat sink assembly 10. The third operating condition corresponds to a cleaning mode in which any debris accumulated on the bottom surface of the magnetic clamping heat sink assembly 10 can be removed.

Figure 3A:
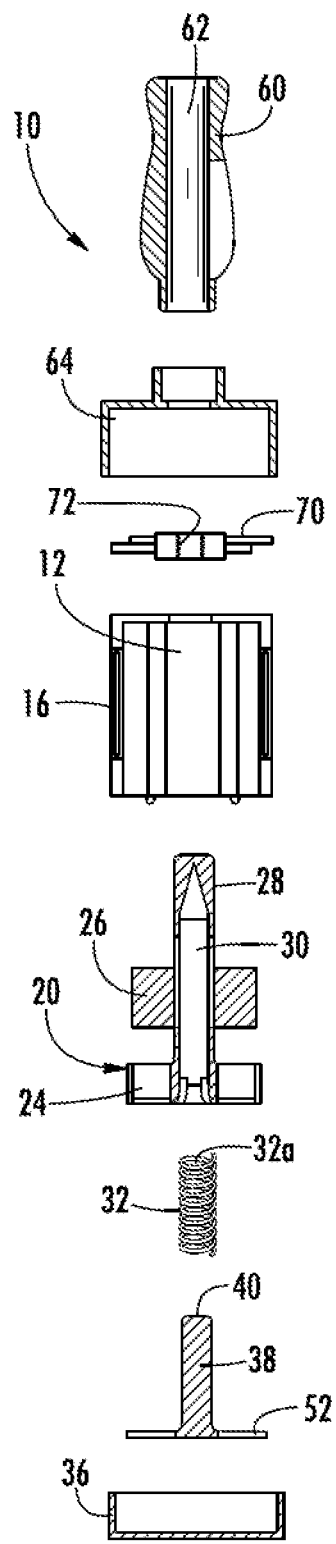
FIG. 3A is an exploded side view in cross section of the first embodiment of magnetic clamping heat sink assembly.
Figure 3B:
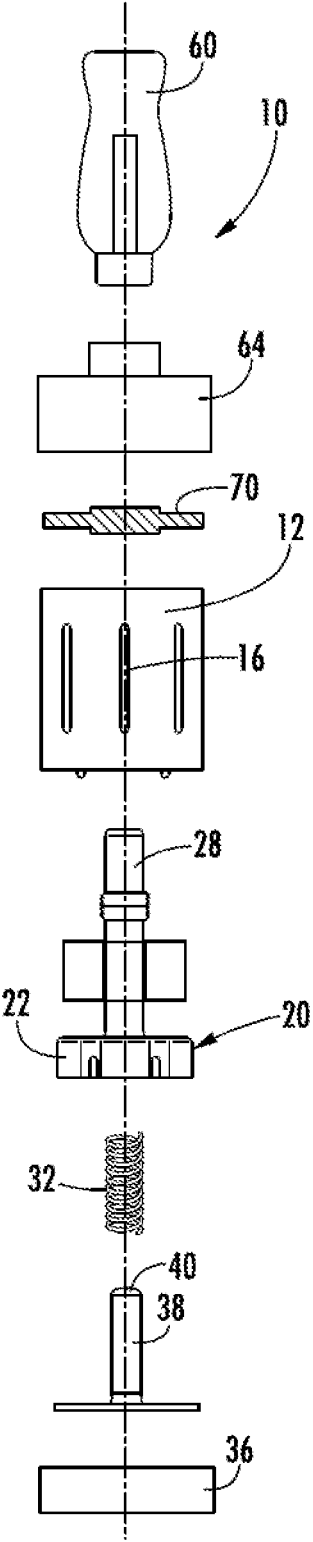
FIG. 3B is an exploded side view of the first embodiment of the magnetic clamping heat sink assembly.

For enhanced cooling, as shown most clearly in FIGS. 1, 3A, and 3B, the magnetic clamping heat sink assembly 10 optionally includes a fan 70 positioned inside the guide housing 12. The fan 70 includes an internal threading 72, and the central post 28 includes an external threading 74 configured to matingly engage the internal threading 72 such that movement of the carrier body 22 between the first and second operating positions rotationally drives the fan 70. The threads 72, 74 are preferably relatively coarse such that a single stroke of the carrier body 22 along the central post 28 provides for multiple rotation cycles of the fan 70.

In another embodiment, a liquid cooling pump is provided that is driven by the linear movement of the carrier body 22 within the guide housing 12. In another embodiment, a rack and pinion gear arrangement can be provided to drive the fan 70. A magnetically driven fan can also be provided that rotates based on changing magnetic fields. In another embodiment, a cavity is provided within the base assembly 34 for retaining a coolant, such as ice, cooling stones, phase change materials, or other types of coolant.

Figures 6A, 6B:
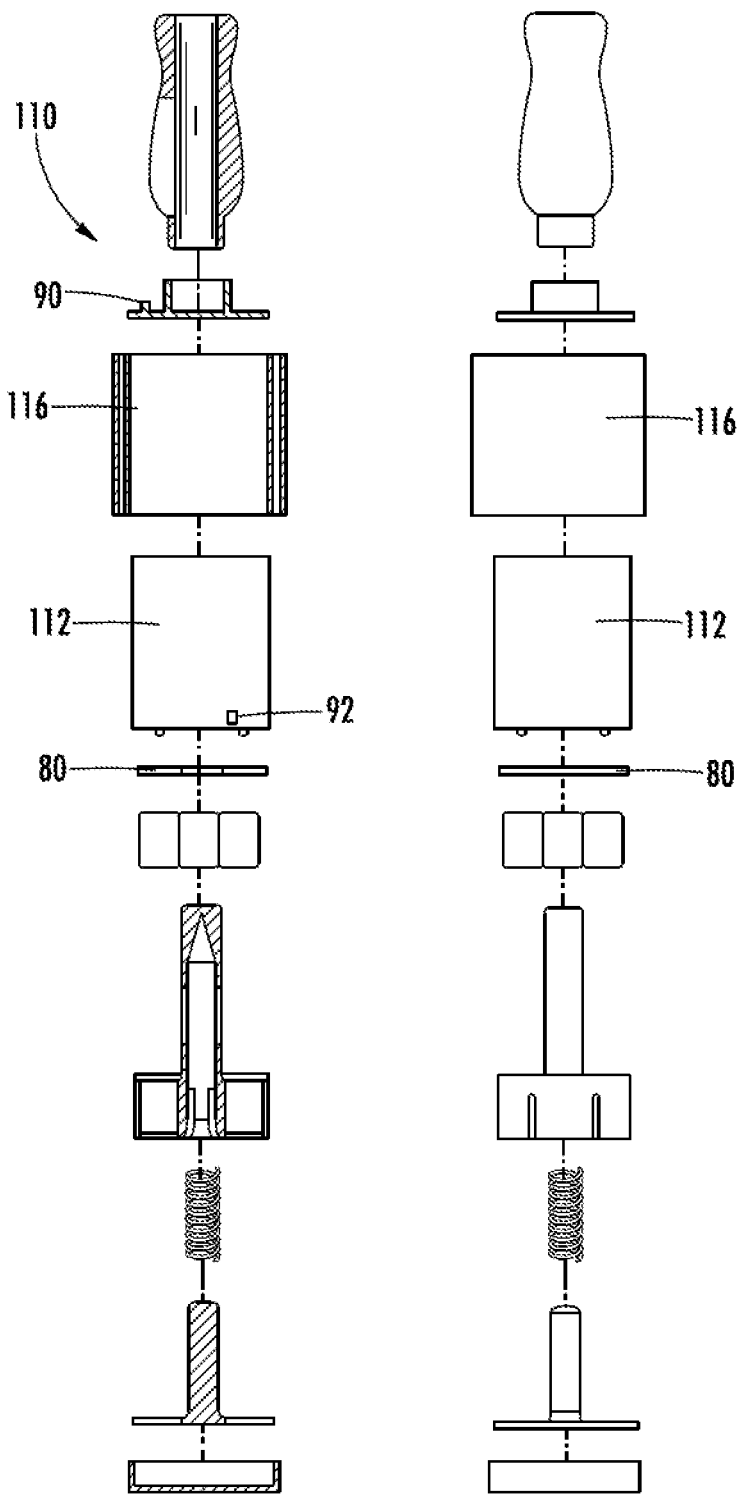
FIG. 6A is an exploded side view in cross section of the second embodiment of the magnetic clamping heat sink assembly.
FIG. 6B is an exploded side view of the second embodiment of the magnetic clamping heat sink assembly.

As shown in FIGS. 6A and 6B, a magnetic shield 80 can be positioned above the magnetic assembly 20. The magnetic shield 80 is shown positioned in an upper region of the magnetic clamping heat sink assembly 110 to direct the magnetic field of the magnets 26 toward the metallic washer 3. The magnetic shield 80 can include ferrite strips or Giron material. Although the magnetic shield 80 is illustrated as a disc, one of ordinary skill in the art would recognize from the present disclosure that alternative shapes of the magnetic shield could be used.

As shown in FIG. 6A, a light 90 is optionally provided on the magnetic clamping heat sink assembly 110. A switch 92 for controlling the light 90 is provided on the magnetic clamping heat sink assembly 110 and the switch 92 is actuated when the carrier body 22 changes position. Accordingly, the light 90 serves as a visual indicator of a position of the carrier body 22 to a user. The light 90 can be provided on a top plate of the magnetic clamping heat sink assembly 110.

In another embodiment, a method of fixing a membrane 4 to a surface 2 is disclosed. The surface 2 is preferably a surface of a roof. The method includes affixing a metallic washer 3, preferably a roofing washer, having a heat-activated adhesive layer 3a on the surface 2. The heat-activated adhesive layer 3a is preferably applied to an axially raised attachment ring of the metallic washer 3. The metallic washer 3 is installed on a roof surface using a fastener 5. The method includes arranging the membrane 4 on top of the surface 2 and the heat-activated adhesive layer 3a of the metallic washer 3. The metallic washer 3 is heated via an inductive heating tool (shown in broken lines as tool 7 in FIG. 4A) to activate the heat-activated adhesive layer 3*a* such that the membrane 4 is fixable to the metallic washer 3 via the heat-activated adhesive layer 3*a* bonding to the heat softened membrane 4. As shown in FIG. 4B, a magnetic clamping heat sink assembly 10 is positioned on the membrane 4 adjacent to the metallic washer 3. The magnetic clamping heat sink assembly 10 magnetically clamps to the metallic washer 3 via magnetic attraction between at least one magnet 26 in the magnetic clamping heat sink assembly 10 and the metallic washer 3 causing the magnetic clamping heat sink assembly 10 to move to the second operating condition applying a force against the membrane 4 when the magnetic clamping heat sink assembly 10 sufficiently overlaps the metallic washer 3 to form a secure bond. The method then includes cooling the metallic washer 3, the heat-activated adhesive layer 3*a*, and the membrane 4 by removing heat through the magnetic clamping heat sink assembly 10 to form a secure bond. This occurs when the magnetic clamping heat sink assembly 10 and the metallic washer 3 radially overlap by at least about 75% of an area of the magnetic washer 3 such that the magnet 26 generates a sufficient magnetic force attraction with the metallic washer 3 to override the force of the spring 32 and the magnetic clamping heat sink assembly 10 moves to the second operating condition. The weight of the magnetic clamping heat sink assembly 10 and the magnetic force from the magnet 26 clamp the membrane 4 to the metallic washer 3 to securely bond the membrane 4 to the metallic washer 3.

Figure 7A:
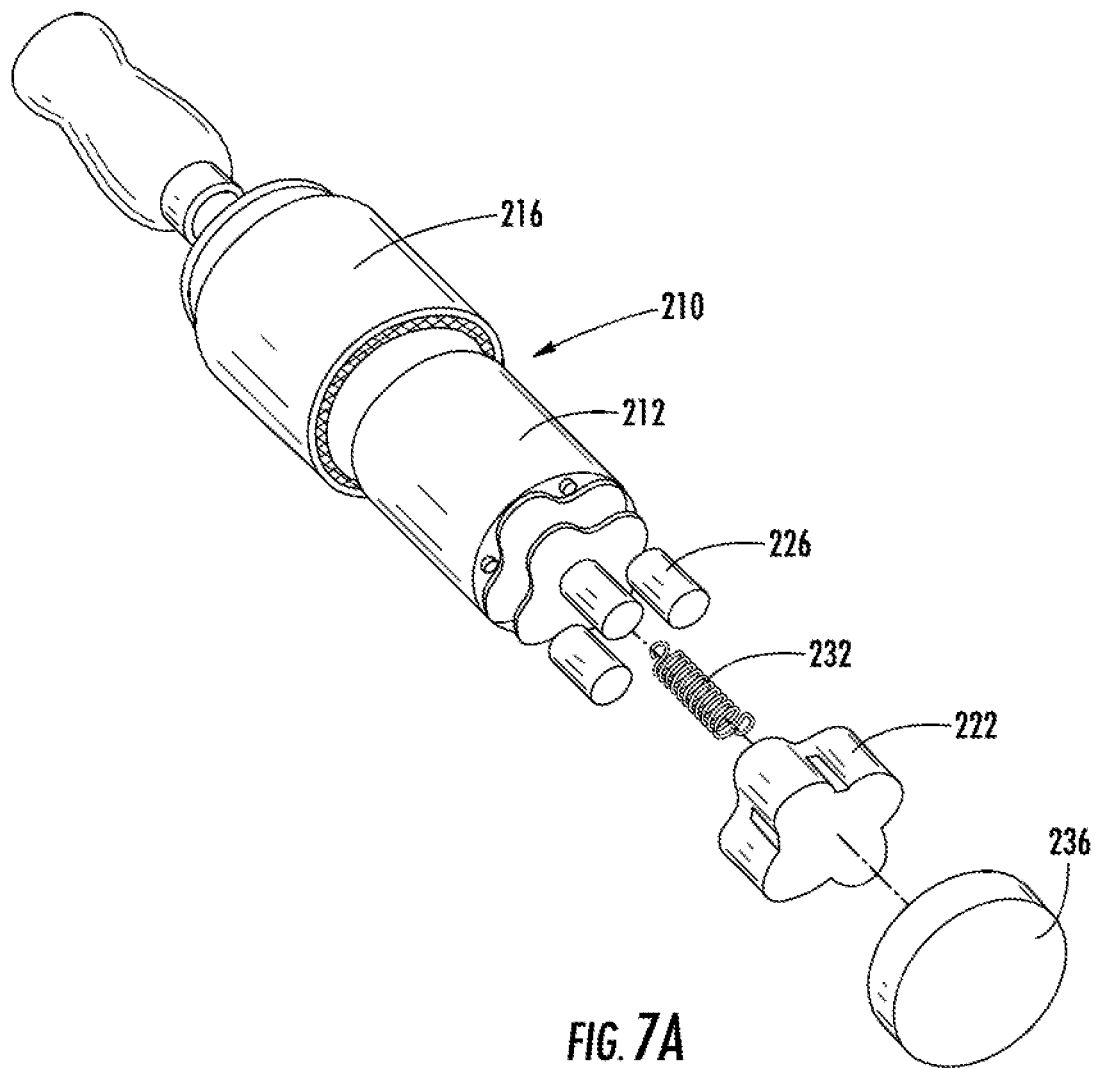
FIG. 7A is an exploded perspective view of a magnetic clamping heat sink assembly according to a third embodiment.
Figure 7B:
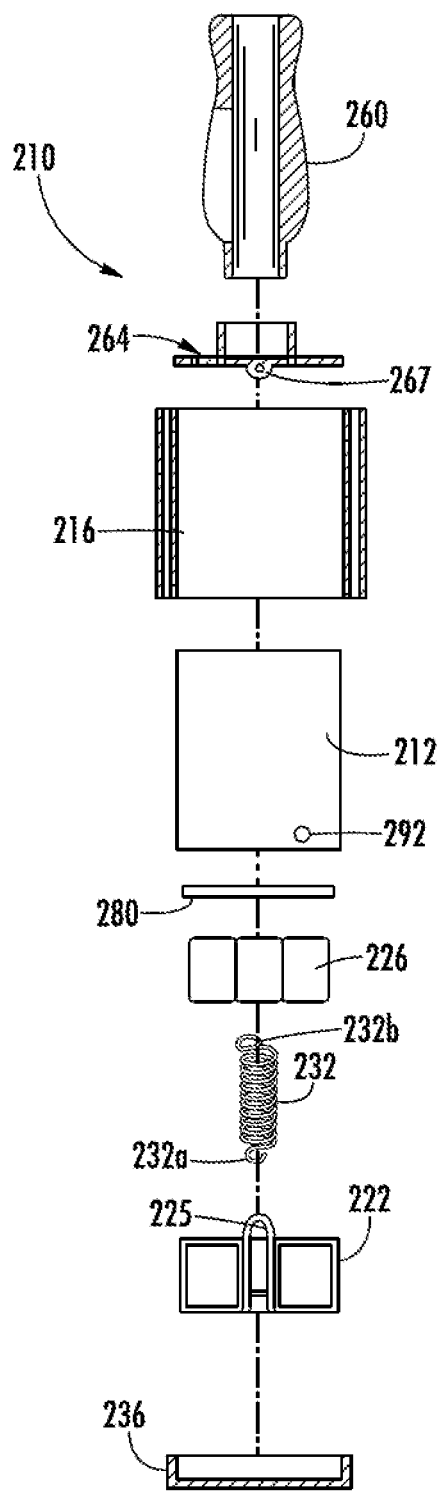
FIG. 7B is an exploded side view in cross section of the third embodiment of the magnetic clamping heat sink assembly.
Figure 7C:
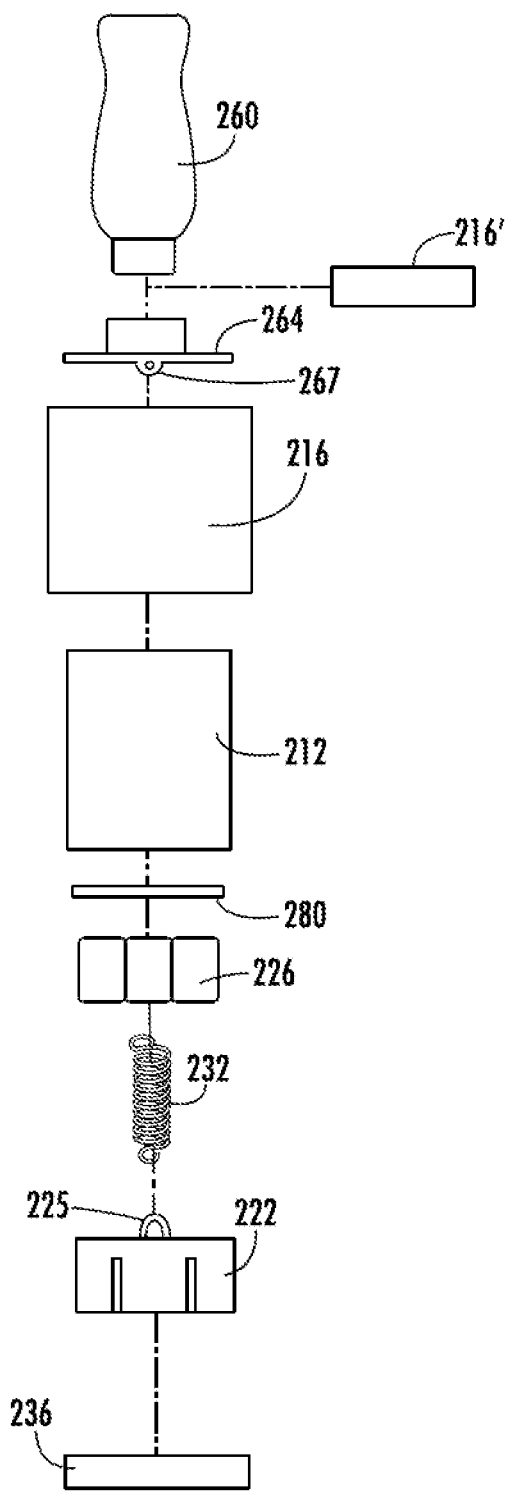
FIG. 7C is an exploded side view of the third embodiment of the magnetic clamping heat sink assembly.

FIGS. 7A-7C illustrate another embodiment of a magnetic clamping heat sink assembly 210. This embodiment includes an internal guide housing 212 and an external housing 216. This embodiment differs from the embodiments described above with respect to the carrier body 222 and the spring 232. In the embodiment of FIGS. 7A-7C, the carrier body 222 is guided within the guide housing 212 without the use of any post element. The carrier body 222 includes a loop 225 configured for attachment to a first end 232*a* of the spring 232. The first end 232*a* of the spring 232 includes a hook for attachment to the loop 225 of the carrier body 222. A second end 232*b* of the spring 232 includes a hook for attachment to a loop 267 formed on a top plate 264 of the assembly 210. While loops are shown in the drawings, one of ordinary skill in the art would understand that any type of attachment means can be used for attaching the spring 232 to the carrier body 222 and another component of the assembly 210. The spring 232 can be attached to the handle 260 or other feature of the assembly 210.

In one embodiment, the spring 232 is an extension spring. The spring 232 can be hooked, pinned, or otherwise fixed to the carrier body 222 and the top plate 264. In a resting state, the spring 232 is extended to 10-20% of its full extension length. In one embodiment, the spring 232 is extended by 15% in the resting state. The carrier body 222 and magnets 226 pull the spring 232 to a slightly extended position in the resting state due to the weight of the carrier body 222 and the magnets 226. This configuration allows a user to invert the assembly, during which the carrier body 222 slides towards the top plate 264, and reduces the magnetic force on the bottom cap 236. In this inverted state, removal of metal chips from the bottom cap 236 is easier than known configurations. The general function of the magnetic clamping heat sink assembly 210 is similar to the function and description provided above with respect to FIGS. 5, 6A, and 6B. The magnet 226 within the carrier body 222 pulls the spring 232 to an extended state when the assembly 210 is positioned sufficiently over an induction welding plate, as described in detail above.

In one embodiment, the outer housing 216 is formed as a hollow tube or extrusion of a thermally conductive material, such as aluminum. The outer housing 216 can be assembled with the top plate 264 and the bottom cap 236 according to a variety of attachment configurations. In one embodiment, the outer housing 216 includes a threading at each axial end that matingly engages corresponding threading on the top plate 264 and the bottom cap 236. Any type of connection, pin, screw, adhesive, weld, or connection can be used to connect these components. In one embodiment, the top plate 264 and the bottom cap 236 are connected directly to the guide housing 212. In one embodiment, the top plate 264 has approximately the same outer diameter as the guide housing 212. In another embodiment, the top plate 264 can have a slightly smaller outer diameter than an inner diameter of the guide housing 212. The top plate 264 can be inserted or otherwise plugged into the guide housing 212 via a friction fit or interference fit. The guide housing 212 can be formed from a thermally conductive material, such as aluminum. In one embodiment, the outer housing 216, including a heat sink, is slid around the guide housing 212 and the top plate 264 combination, and the outer housing 216 rests flush with the bottom cap 236. The top plate 264 and the guide housing 212 can be flush with each other to allow for an additional heat sink 216' (shown in FIG. 7C) to be placed over an axial end surface of the combined top plate 264 and guide housing 212. The additional heat sink 216' can include an opening to accommodate the extension of the top plate 264. The additional heat sink 216' can include a generally circular hollow core. In one embodiment, the additional heat sink 216' includes an outer profile having a smooth surface. In one embodiment, the additional heat sink 216' includes extruded ribs for increased heat transfer. As shown in FIGS. 7A-7C, the magnetic clamping heat sink assembly 210 can also include a magnetic shield 280 and a switch 292, as described above with respect to the other embodiments.

Figure 8A:
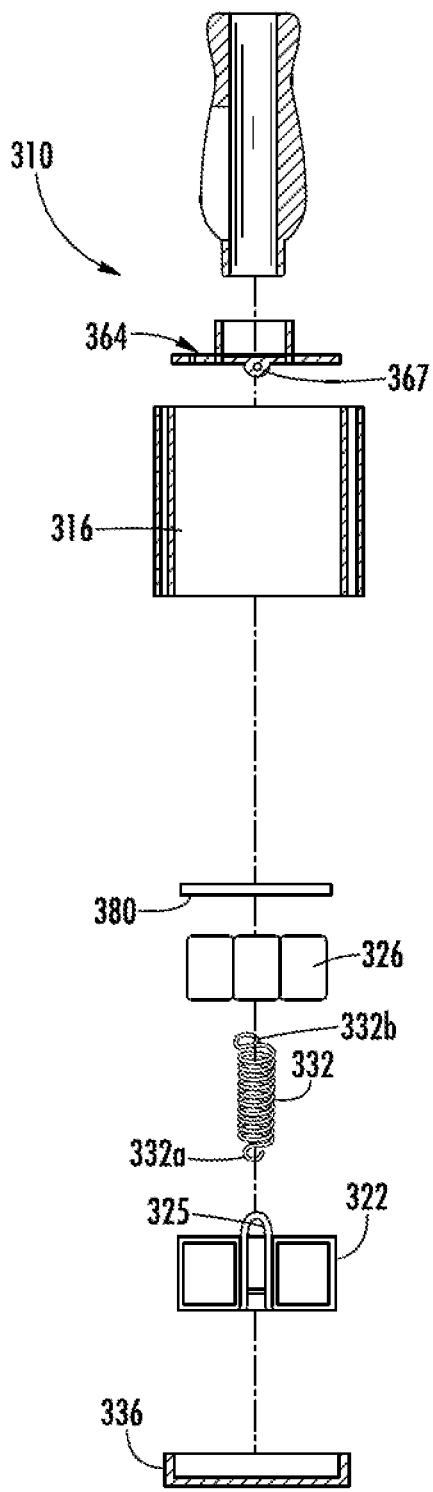
FIG. 8A is an exploded side view in cross section of a fourth embodiment of the magnetic clamping heat sink assembly.
Figure 8B:
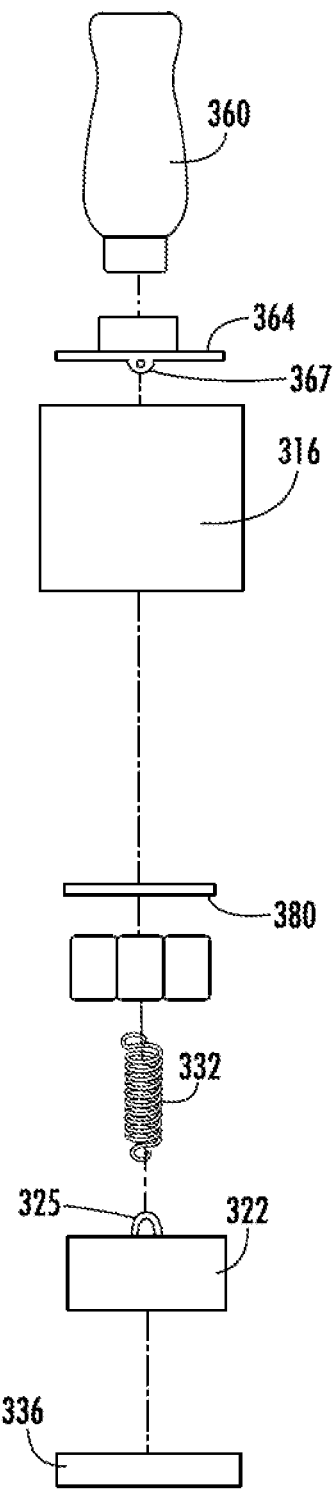
FIG. 8B is an exploded side view in cross section of the fourth embodiment of the magnetic clamping heat sink assembly.

FIGS. 8A and 8B illustrate another embodiment of a magnetic clamping heat sink assembly 310. This embodiment is similar to the embodiment described above in FIGS. 7A-7C except for the following distinctions. The assembly 310 lacks an internal guide housing (i.e. guide housing 212), and instead the carrier body 322 is directly guided within an outer housing 316. In this embodiment, the carrier body 322 has a non-keyed construction, and a circular outer surface. The circular outer diameter of the carrier body 322 is guided within the circular inner diameter surface of the outer housing 316. The remaining features, which are not specifically discussed herein, are similar to the elements of FIGS. 7A-7C, such as the configuration of the spring 332. The magnetic clamping heat sink assembly 310 also includes a handle 360, top plate 364, loops 325, 367, magnetic shield 380, magnets 326, spring 332 (with spring ends 332*b*, 332*a*), and base plate 336.

Having thus described various embodiments of the present magnetic clamping heat sink assembly in detail, it is to be appreciated and will be apparent to those skilled in the art that many physical changes, only a few of which are exemplified in the detailed description above, could be made in the apparatus and method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method of fixing a membrane to a surface, the method comprising:
    affixing a metallic washer having a heat-activated adhesive layer on a surface;
    arranging a membrane on top of the surface and the heat-activated adhesive layer of the metallic washer;
    heating the metallic washer via an inductive heating tool to activate the heat-activated adhesive layer such that the membrane is fixable to the metallic washer via the heat-activated adhesive layer bonding to the membrane;
    positioning a magnetic clamping heat sink assembly on the membrane adjacent to the metallic washer, the magnetic clamping heat sink assembly including a magnetic assembly including a carrier body defining at least one seat in which at least one magnet is arranged, and a spring resiliently biasing the carrier body;
    magnetically clamping the magnetic clamping heat sink assembly to the metallic washer via magnetic attraction between the at least one magnet in the magnetic clamping heat sink assembly and the metallic washer causing the magnetic clamping heat sink assembly to apply a force against the membrane when the magnetic clamping heat sink assembly sufficiently overlaps the metallic washer to form a secure bond; and
    cooling the metallic washer, the heat-activated adhesive layer, and the membrane by removing heat through the magnetic clamping heat sink assembly.

2. The method of claim 1, wherein the heat-activated adhesive layer is applied to an axially raised attachment ring of the metallic washer.

3. The method of claim 1, wherein the surface is a roof surface.

4. The method of claim 1, wherein the magnetic clamping heat sink assembly and the metallic washer radially overlap by at least about 75% of an area of the metallic washer when the magnetic clamping heat sink assembly is positioned adjacent to the metallic washer.

5. The method of claim 1, wherein the magnetic clamping heat sink assembly includes:
    a base assembly including a base plate.

6. The method of claim 5, wherein the spring holds the carrier body at a medial position spaced apart from the base plate when the base assembly of the magnetic clamping heat sink assembly is positioned away from the metallic washer, and
    the carrier body is driven downward against a force of the spring to a lower position and into contact with the base plate by magnetic attraction between the at least one magnet and the metallic washer when the magnetic clamping heat sink assembly is positioned on the membrane adjacent to the metallic washer.

* * * * *